Dec. 14, 1954  JANIS-INDRIKIS IKSE  2,696,669
DEVICE FOR SUPPLY OF LIQUID DURING DENTAL OPERATIONS
Filed Dec. 15, 1952  2 Sheets—Sheet 1

INVENTOR.
JANIS-INDRIKIS IKSE
BY
*Linton and Linton*
ATTORNEYS

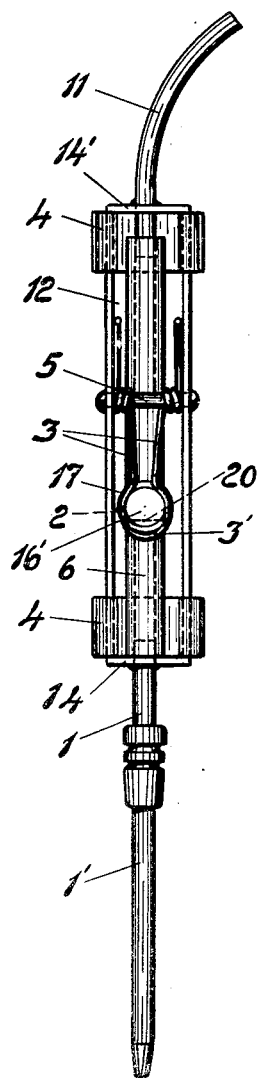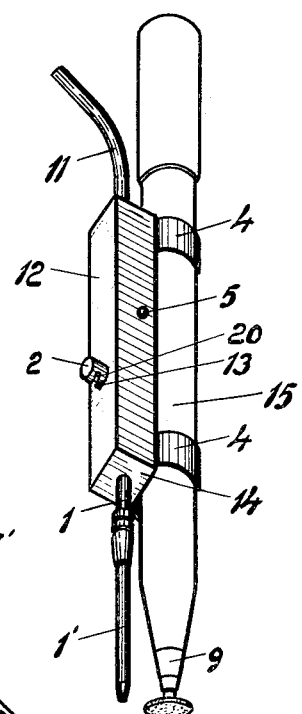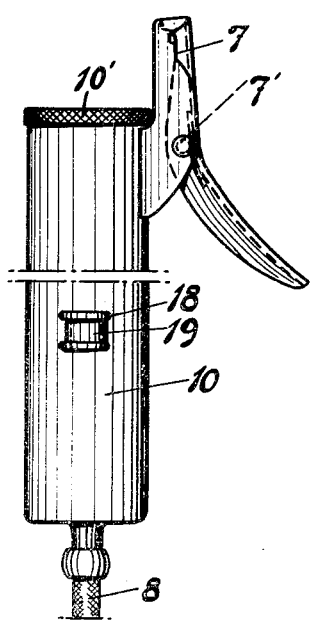

United States Patent Office 2,696,669
Patented Dec. 14, 1954

2,696,669
DEVICE FOR SUPPLY OF LIQUID DURING DENTAL OPERATIONS

Janis-Indrikis Ikse, Goteborg, Sweden

Application December 15, 1952, Serial No. 326,031

Claims priority, application Sweden January 22, 1952

3 Claims. (Cl. 32—28)

The present invention relates to a device for supply of liquid such as water to a patient's tooth and/or to a dental tool during dental operations in which the tool is carried by a hand piece of a dental engine.

An important object of the invention is to provide a device in which an elastic tube constituting an essential part of a valve for control of the flow of liquid will not easily be damaged by the sharp or pointed instruments manipulated by the dentist. Another object of the invention is to provide a device of the kind referred to which can be readily attached to all usual forms of hand pieces of dental engines and which will be easily operable and assume a steady position in the dentist's hand holding the hand piece.

A further object of the invention is to provide a device all parts of which will be easily sterilizable.

These and other objects of the invention will be made clear by the following description with reference to the accompanying drawings illustrating an embodiment of the invention.

Figure 1:
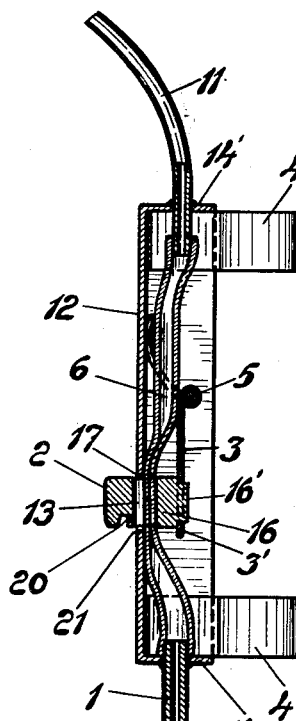
Figure 1A:
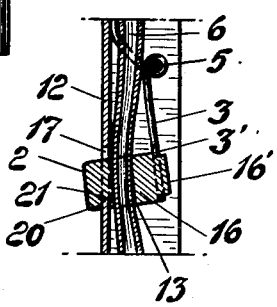
Figure 3:
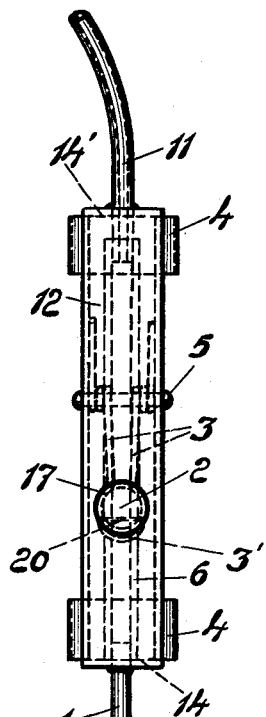
Figure 2:
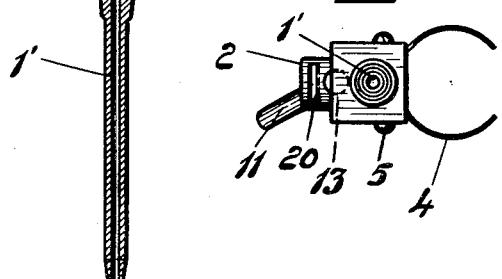

In the drawings, Fig. 1 is a longitudinal section of the device. Fig. 1a is a fragmentary view of the valve in open or in inoperative position. Fig. 2 is an end elevation of the same device. Fig. 3 and Fig. 4 show the device from above and from below respectively. Fig. 5 is a perspective view of the device fitted on a hand piece for a rotary tool. Fig. 6 is a side elevation of the tank for the liquid.

In the drawings, 1 indicates a rigid nozzle pipe and 1' the nozzle of the device, said nozzle being interchangeable, so that the dentist in each operation can select a nozzle of desired shape or construction for the actual purpose. The rear end of the nozzle pipe 1 is connected to one end of an elastic tube the other end of which is connected to a substantially rigid pipe 11. This pipe, in turn, by means of a hose or flexible tube 8 is connected to a tank 10 for the liquid. The hose 6 is enclosed by a rigid cover or casing 12 of substantially box-shaped form through one end wall 14 of which the rear end portion of the nozzle pipe 1 extends whereas the fore end portion of the pipe 11 extends into the casing 12 through the other end wall 14' of said casing to which the pipe 11 is rigidly connected. The hose 6 in the casing 12 extends through a hole or recess 13 in a member 16 forming a portion of a push button 2 extending through a hole 17 in the longitudinal front wall of the casing to the outside thereof. In the casing 12 a spring 3, preferably a wire spring, is provided and connected to the casing by means of a rivet 5, said spring by means of a loop 3' embracing the stepped end portion 16' of the member 16. The spring 3 tends to move the push button outwards to the position shown in Fig. 1 in which the elastic tube or hose 6 which is effectively closed at both ends of the hole 13 where the tube 6 is forced against the inner side of the casing at the edges of the hole 17 through which the push button extends into the casing. The hole 13 in the member 16 has such a size that when the push button 2 is forced inwardly by the operator against the action of the spring 3 the hose or tube 6 by its elasticity and the pressure of the liquid will expand to its normal width and permit the flow of the liquid to the nozzle 1'. Thus the tube 6 and the portion or member 16 of the push button 2 form together a simple but efficient valve for the present purpose. The push button 2 is also formed with a circumferential notch or groove 20 adapted to engage with the edge portion 21 surrounding the hole 17 in the casing 12 in order to hold the push button in open or inoperative position as shown in Fig. 1a. For this purpose the loop 3' surrounding the stepped portion 16' of the member 16 and also the hole 17 in the casing 12 have the width required to permit a slight lateral movement of the push button when it has been operated to open the passage for the liquid through the elastic tube 6. Thus, the push button may be locked in inoperative position when desired to maintain the hose 6 open through its entire length. This arrangement also facilitates effective sterilization of the entire device.

The box-shaped casing is provided with two resilient clips 4 projecting from the open side of the casing and adapted to partially embrace the hand piece 15 of the tool 9 and detachably connect the device thereto. It is evident that in the position on the hand piece the elastic tube 6 of the valve will be entirely enclosed and protected from damage by the sharp instruments handled by the operator.

As shown by Figs. 1 and 3 the pipe 11 secured to the rear end wall 14' of the casing 12 has the form of an obtuse angle the outer branch of the pipe directed rearwardly and extending to the same side of the casing 6 as the push button 2. As shown by Fig. 3 the pipe 11 is also bent somewhat laterally in relation to the casing. This form of the pipe 11 is of importance since by this means the casing 11 carried by the hand piece of the dental engine will obtain a fixed position in the dentist's hand holding the hand piece, the pipe 11 being then positioned inside the base of the thumb of the hand so that said pipe and the casing 12 rigidly connected thereto will have lateral support in the hand. Thus, by the arrangement of the pipe 11, the device will have an anatomically correct position in operator's hand.

The tank 10 which is closed by a removable cover 10' is provided with a clamp 7 the pivotal shank of which is forced by a spring 7' against the fixed shank of the clamp. By this clamp the water tank 10 may be suspended and easily secured to a suitable part of the dental engine enabling also easy removal of the tank.

Said tank on its side wall is provided with a vertical socket or cylindrical part 19 having two spaced flanges 18. When not in use, the casing 12 with the parts connected thereto may be suspended on the part or socket 19 by means of one of the clips 4 which will engage with said part between the flanges 18.

The manner of operation and use of the device seem to be evident in all essential respects by above description. When the dentist operates by means of the rotary tool at a tooth he has always the device on the hand piece easily accessible for control of the supply of the liquid to the operation spot by the same hand as holds the hand piece for the tool and exerts by a finger of this hand a pressure on the push button 2 so that the liquid at the desired moment and in desired quantities will be supplied to the tooth and/or the tool. Various forms of the nozzle 1' may be used to suit various requirements. By the use of this device the dentist's work will be essentially facilitated and hastened. As an advantage it may also be emphasized that the entire device in practical use can be easily sterilized by boiling in usual manner.

What I claim is:

1. A device for supply of liquid to a patient's tooth and/or to a dental tool during dental operations in which the tool is carried by a hand piece of a dental engine, said device comprising a casing of extended form, means for removable connection of the casing to the hand piece, an elastic tube within the casing, a nozzle pipe attached to one end of the casing extending into the casing and connected with one end of the elastic tube, a substantially rigid pipe rigidly attached to the opposite end of the casing extending into the casing and connected with the other end of the elastic tube within the casing for supply of a flow of liquid through said elastic tube, a movable member in the casing, a hole in said member, the elastic tube passing through said hole, a spring acting on said member for clamping the elastic tube at both ends of the hole against the inside of the casing and preventing the flow of liquid through the elastic tube, and operating means for said member for moving the latter against the action of the spring to permit flow of liquid through the elastic tube to the nozzle pipe.

2. A device for supply of liquid to a patient's tooth and/or to a dental tool during dental operations by means of the tool which is carried by a hand piece of a dental engine, said device comprising a casing of extended form, means for removable fastening of the casing to the hand piece, an elastic tube within the casing, a nozzle pipe attached to one end of the casing and connected with one end of the elastic tube, a pipe rigidly connected to the opposite end of the casing, one end of this latter pipe connected with the other end of the elastic tube, a tank for the liquid, a hose connecting this tank with the other end of the latter pipe, means on said tank for suspending the casing thereon in non-use of the device, a movable member in the casing for closing the elastic tube by pressure against the outer side of this tube, and means for operating this member to permit flow of liquid from the tank through the elastic tube to the nozzle pipe.

3. A device for supply of liquid to a patient's tooth and/or to a dental tool during dental operations by means of the tool which is carried by a hand piece of the dental engine, said device comprising a casing of extended box-like shape, means including a clip for releasable connection of the casing to the hand piece, an elastic tube within the casing, a nozzle pipe attached to one end of the casing and connected with one end of the elastic tube, a substantially rigid pipe attached to the opposite end of the casing and connected by one end to the other end of the elastic tube, a tank for the liquid, a hose connecting this tank with the other end of the latter pipe, a cylindrical part attached to the side wall of the tank, spaced flanges on said cylindrical part, said clip adapted to engage with said cylindrical part for suspension of the casing at the tank in non-use of the device, a movable member in the casing for closing the elastic tube by pressure against the outer side of this tube, and means for operating this member to permit flow of the liquid from the tank through the elastic tube to the nozzle pipe.

References Cited in the file of this patent

UNITED STATES PATENTS

| Number | Name | Date |
|---|---|---|
| 810,611 | Blasingame | Jan. 23, 1906 |
| 1,556,181 | Tyree | Oct. 6, 1925 |
| 2,231,393 | Mulvany | Feb. 11, 1941 |
| 2,570,812 | Jackson | Oct. 9, 1951 |